April 6, 1954 J. J. JACKSON ET AL 2,674,721
VARIABLE GAP WIDTH CONTROL FOR TELEVISION
HORIZONTAL SWEEP TRANSFORMERS
Filed May 15, 1951 2 Sheets-Sheet 1

INVENTORS.
JOYCE J. JACKSON,
JOHN M. NARRACE.
BY
McMorrow, Berman + Davidson
ATTORNEYS.

April 6, 1954 | J. J. JACKSON ET AL | 2,674,721

VARIABLE GAP WIDTH CONTROL FOR TELEVISION HORIZONTAL SWEEP TRANSFORMERS

Filed May 15, 1951 | 2 Sheets-Sheet 2

INVENTORS.
JOYCE J. JACKSON.
JOHN M. NARRACE,
BY
McMorrow, Berman + Davidson
ATTORNEYS.

Patented Apr. 6, 1954 2,674,721

UNITED STATES PATENT OFFICE 2,674,721

VARIABLE GAP WIDTH CONTROL FOR TELEVISION HORIZONTAL SWEEP TRANSFORMERS

Joyce J. Jackson, Chicago, and John M. Narrace, Melrose Park, Ill.

Application May 15, 1951, Serial No. 226,408

5 Claims. (Cl. 336—134)

This invention relates to electrical transformers, and more particularly to horizontal sweep transformers employed in television receivers.

A main object of the invention is to provide a novel and improved horizontal sweep transformer for cathode ray, image-reproducing tubes which is provided with improved means for regulating the horizontal width of the image raster produced by the electron beam of the cathode ray tube with which the transformer is employed.

A further object of the invention is to provide an improved horizontal sweep transformer of simple construction provided with means for regulating the sweep width of the beam of a cathode ray tube with which the transformer is employed without requiring the use of auxiliary electrical elements, such as variable inductances, as are employed in conjunction with present horizontal output transformers in television receivers to regulate the width of the raster produced on the screen of the cathode ray tube associated with the transformer and which provides the desired control of horizontal width without producing excessive loss of high voltage, spurious oscillations and excessive changes in currents and operating conditions in the transformer and the driving tube associated therewith.

A still further object of the invention is to provide an improved horizontal sweep transformer for use in television receivers which includes readily operable means for adjusting the horizontal sweep width, the width adjusting means involving relatively simple elements, requiring no electrical connections, and introducing no spurious oscillations or other undesired effects when the width adjustments are made.

A still further object of the invention is to provide an improved horizontal output transformer for use in television receivers which includes means for regulating the horizontal width of the scanning raster produced on the screen of the cathode ray tube associated with the transformer, the improved output transformer being inexpensive to manufacture, being easy to install, involving a minimum number of electrical connections, and being readily substituted for the horizontal output transformers provided in existing television receivers, whereby the improved horizontal output transformer of the present invention may be installed as a replacement for the previous transformers without requiring major modifications in the existing television receivers.

Further objects and advantages of the invention will become apparent from the following description and claims, and from the accompanying drawings, wherein:

Figure 4:
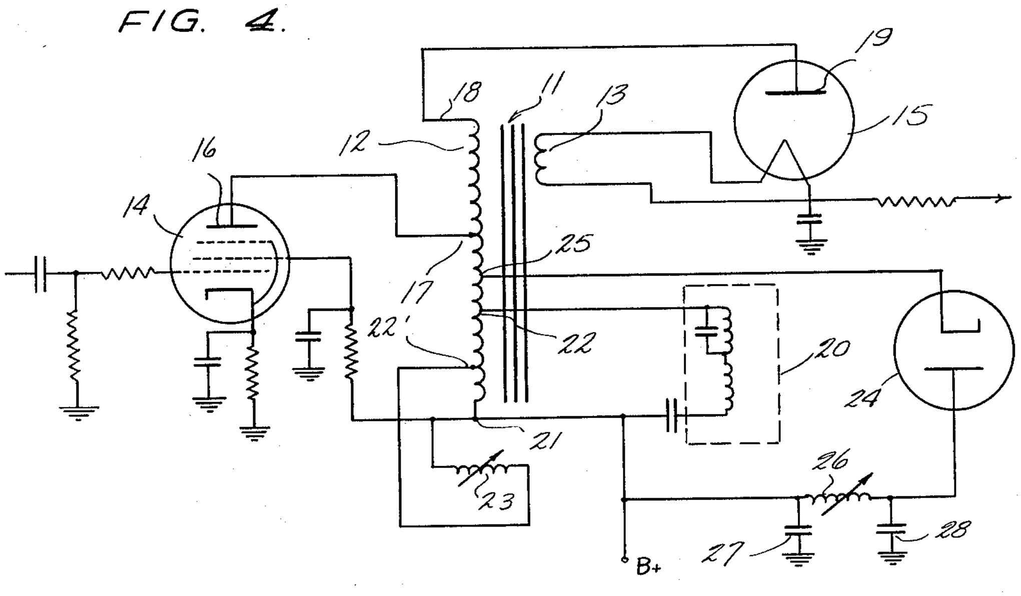
Figure 4 is a schematic wiring diagram of one form of conventional horizontal output circuit provided with means for regulating the width of the scanning raster on the screen of a television receiver, as employed in present television receivers.

Referring to the drawings, and more particularly to Figure 4, it will be seen that in a conventional horizontal output circuit as employed in present television receivers a horizontal output transformer, designated at 11, may be employed comprising a main, or primary winding 12 and a filament, or secondary winding 13. The driver tube for the horizontal output stage is designated at 14 and the high voltage rectifier tube is designated at 15. As shown, the plate 16 of the driver tube is connected to a tap 17 of the primary winding 12 and the terminal 18 of the primary winding is connected to the plate 19 of the high voltage rectifier tube 15. The horizontal yoke is shown at 20 and is connected between the terminal 21 of primary winding 12 and a tap 22 thereon. Connected across a portion of primary 12, between tap 22′ and the terminal 21, is a variable inductance coil 23. Designated at 24 is the horizontal damping tube which is connected between the terminal 21 and a tap 25 on primary winding 12, a variable inductance 26 being connected in circuit therewith to provide control of horizontal linearity in conjunction with the respective filter condensers 27 and 28, connected as shown. As is well known to those skilled in the art, the horizontal width of the scanning raster produced by the circuit associated with Figure 4 may be controlled by regulating the inductance of the variable inductor 23, as by adjusting a slug of magnetic material therein. As is well known, when the variable inductor 23 is set at high inductance relative to the section of winding 12 across which it is connected, little effect is produced upon the width of the sweep, but as this inductance is lowered relative to said section, it assumes the characteristics of a short circuiting element, thus introducing losses which reduce the sweep width. These losses are mainly absorbed in the width coil 23. By the use of a circuit such as shown in Figure 4, various detrimental effects are produced, such as "ringing," namely, spurious oscillations, loss of high voltage, drastic changes in the currents and in the operating conditions existing in the transformer and in the driver tube 14, and the like.

Figure 5:
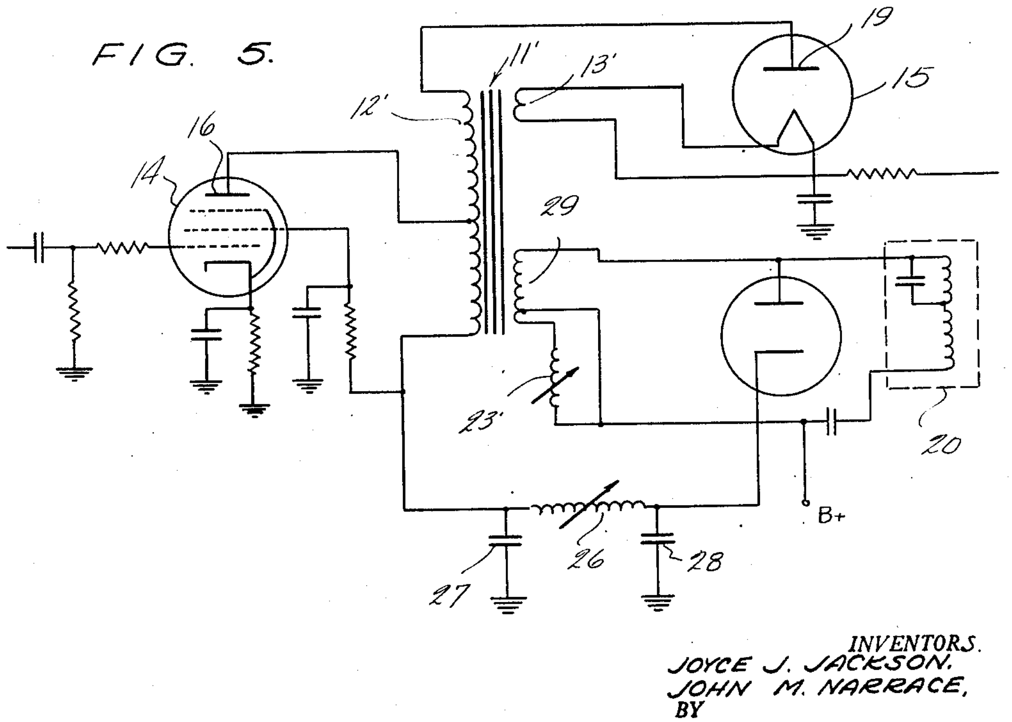
Figure 5 is a second form of conventional horizontal output circuit provided with means for regulating the width of the scanning raster, as employed in existing television receivers.

Figure 5 illustrates another conventional horizontal output circuit in current use in television receivers which comprises a horizontal output transformer 11′ which includes a primary winding 12′, a filament winding 13′ employed to energize the filament of the high voltage rectifier tube 15 and another secondary winding 29 from which the horizontal sweep voltage is delivered to the horizontal yoke 20. Connected across a portion of the secondary winding 29 is the variable inductor 23′ which is employed to provide regulation of the width of the raster produced on the screen of the cathode ray tube with which the output circuit is employed. As in the case of the circuit of Figure 5, when the inductor 23′ is set at high inductance there is practically no effect and the sweep width is maximum, whereas when the inductance of the element 23′ is reduced it assumes the characteristic of a short circuiting element across the portion of secondary winding 29 to which it is connected and introduces losses which reduce the sweep width. As in Figure 4, the losses are mainly absorbed in the winding of the inductor 23′ and are of substantial magnitude. As in the case of the circuit of Figure 4, various detrimental effects are produced, such as "ringing," loss of high voltage, and severe changes in current values and in operating conditions in the transformer 11′ and in the driving tube 14 associated therewith.

Figures 1, 2:
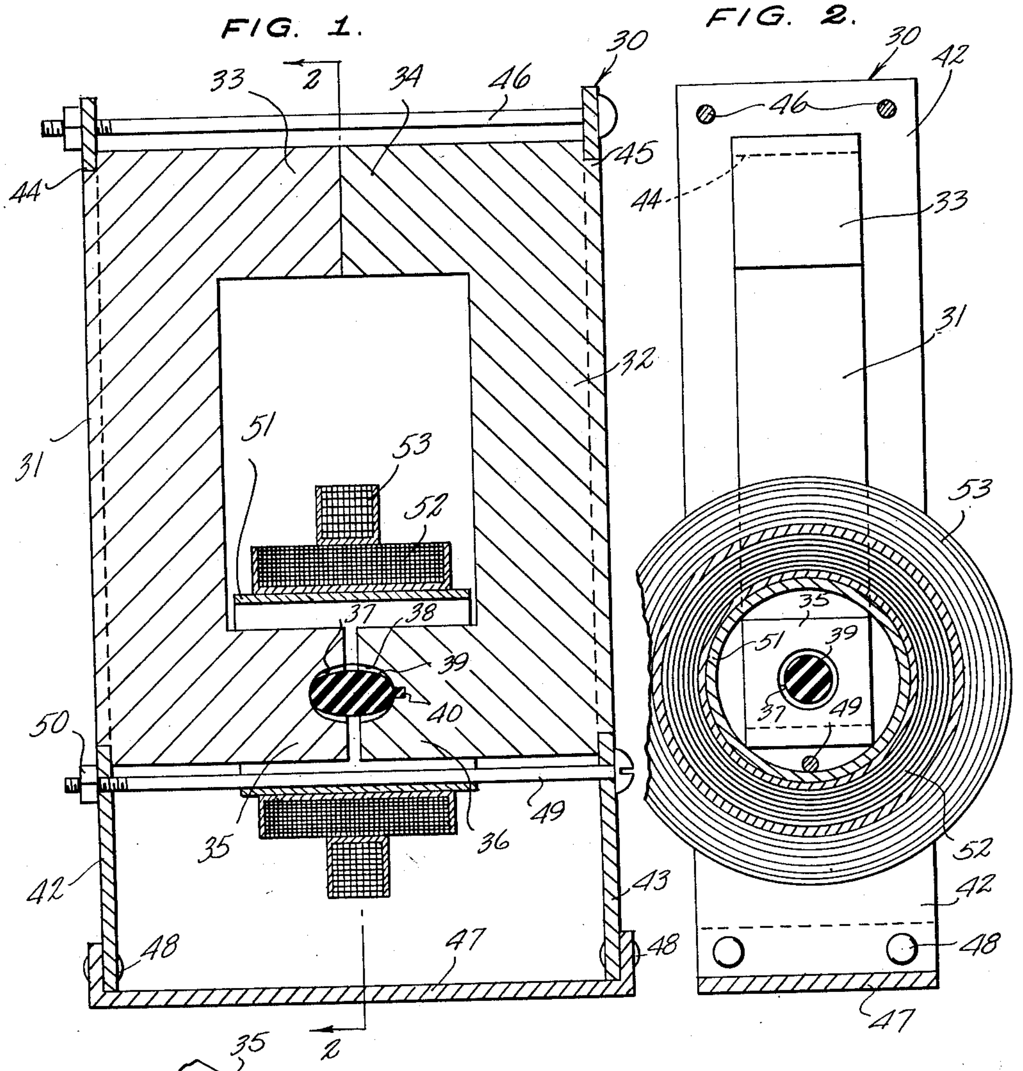
Figure 1 is a vertical cross sectional view taken through an improved horizontal sweep transformer constructed in accordance with the present invention.
Figure 2 is a cross sectional view taken on the line 2—2 of Figure 1.
Figure 3:
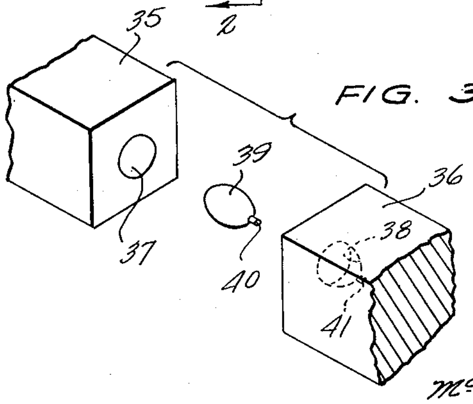
Figure 3 is a fragmentary perspective view of the end portions of the core frame pieces and the means defining the variable air gap between said end portions, as employed in the transformer of Figures 1 and 2.

Referring now to Figures 1, 2 and 3, an improved sweep transformer is illustrated according to the present invention which eliminates the necessity of providing a loss-introducing variable inductor 23 or 23′ in the circuit of the horizontal sweep transformer. The improved horizontal output transformer is designated generally at 30 and comprises a pair of opposing frame members 31 and 32 of suitable magnetic material, such as "Ferrite" having magnetic permeability suitable for use in the horizontal output circuits of television receivers, such magnetic material being well known in the art and forming no part of the present invention.

The frame pieces 31 and 32 are shaped to define an open body when the ends of the frame pieces are placed in abutment with each other, the upper ends of the frame pieces being designated respectively at 33 and 34 and the lower ends of said frame pieces being designated respectively at 35 and 36. As shown in Figures 1 and 3, the end 35 is formed with a recess 37 and the end 36 is formed with a recess 38 located opposite to and registrable with the recess 37 when the pieces 31 and 32 are placed together in the manner of Figure 1. Designated at 39 is an oval resilient body of rubber or similar material provided at one end with a rod-like projection 40 which is frictionally secured in an axial recess 41 formed in the end of the recess 38, thereby securing the body 39 to the frame end 36. When the frame pieces 31 and 32 are placed together in the manner shown in Figure 1, the resilient body 39 is disposed in the opposing recesses 37 and 38 in the manner illustrated in Figure 1, thereby defining a spacer means for separating the ends 35 and 36.

Designated at 42 and 43 are respective rectangular plate members of non-metallic material, such as of phenolic material, said plate members being formed with rectangular openings receiving the shouldered side portions, shown at 44 and 45, of the frame pieces 31 and 32. As shown in Figure 1, the top portions of the plate members 42 and 43 are connected by a pair of clamping bolts 46, 46 disposed adjacent the abutting ends 33 and 34 and the lower ends of the plate members 42 and 43 are secured together by a U-shaped connecting plate 47 whose arms are secured to the ends of plate members 42 and 43 by rivets 48.

As shown in Figures 1 and 2, the lower portions of the plate members 42 and 43 depend a substantial distance below the frame pieces 31 and 32, thereby allowing said plate members to be flexed inwardly toward each other at their intermediate portions. Connecting the plate members 42 and 43 subadjacent the ends 35 and 36 of the frame pieces is a bolt 49 having a nut 50 threaded thereon adjacent the plate member 42, as shown, the bolt 49 being substantially centered and being in vertical alignment with the resilient spacer member 39. It will be readily apparent that the spacer member 39 provides an air gap between the end pieces 35 and 36 and that the magnitude of said gap may be varied by varying the position of the nut 50 on the end of bolt 49.

The windings of the transformer are mounted on a cylindrical form 51 surrounding the ends 35 and 36 in the manner shown in Figures 1 and 2, the transformer windings being shown respectively at 52 and 53. The form 51 is made of nonmagnetic material, such as phenolic material, and the ends of said form are spaced from the frame pieces 31 and 32 sufficiently to provide the required range of adjustment of the air gap between the ends 35 and 36 of the frame pieces 31 and 32 to produce the desired control of horizontal width.

As shown in Figure 1, the resilient spacer member 39 is of oval shape and the recesses 37 and 38 are of similar shape but are somewhat larger in diameter than the normal diameter of the spacer member 39. When the ends 35 and 36 are forced together by tightening the nut 50 on bolt 49 the spacer member 39 is compressed longitudinally and expands laterally, thereby filling the clearance space provided therefor in the recesses 37 and 38. When the resilient spacer member 39 has been compressed so that it substantially fills the recesses 37 and 38 the ends 35 and 36 are substantially in abutment with each other, whereby the air gap between said ends is substantially eliminated. Since the core defined by the frame pieces 31 and 32 has minimum reluctance when the ends 35 and 36 are in abutment, maximum voltage and maximum sweep width is provided by the transformer at this time. When the nut 50 is loosened on the bolt 49, the ends 35 and 36 are allowed to separate by the expansion of the resilient spacer member 39, thereby producing an air gap between ends 35 and 36 which increases the relutance of the core and which reduces the sweep width. It will be noted that the reduction of sweep width is accomplished without relying on losses or dissipation of electrical energy, as in the case of Figures 4 and 5, but is merely produced by increasing the reluctance of the magnetic circuit of the transformer. Since the variation of reluctance is accomplished without introducing any extraneous electrical characteristics into the circuit, such as by the introduction of outside inductance, there is no possibility of producing spurious "ringing" effects, as in the case of the circuits of Figures 4 and 5, and the operating conditions of the transformer and of the driver tube associated therewith are not drastically affected. In a typical practical embodiment of the invention, it has been found that the sweep width of the cathode ray beam of the circuit associated with the transformer can be reduced approximately 20% by opening the gap between the ends 35 and 36 for separation of approximately $\frac{1}{16}$ of an inch. The resilient spacer 39 exerts a biasing action tending to open the gap whereas said gap can be adjusted to any desired magnitude by adjusting the position of nut 50 on bolt 49. The recesses 37 and 38 produce no effect on the efficiency of the transformer core and adjustment of the gap between the ends 35 and 36 in no way affects the operation of the driver tube, does not substantially affect the high voltage produced by the horizontal output circuit, does not produce heating since there are no dissipative losses involved in the width adjustment, and, as above mentioned, produces no spurious or "ringing" effect.

While a specific embodiment of an improved horizontal output transformer for use in television receivers and the like has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A core for an electrical transformer comprising a pair of opposing frame pieces of magnetic material defining an open body when placed together, one set of ends of said frame pieces being in abutment with each other, the other set of ends of said frame pieces having parallel opposing surfaces, said surfaces being formed with opposing recesses, a resilient spacer element substantially housed in said recesses and being arranged to prevent said opposing surfaces of said other set of ends from abutting each other, and adjustable clamping means embracing said frame pieces and urging said frame pieces together, said spacer element providing an air gap between said parallel opposing surfaces of said other set of ends whose length may be varied by adjusting said clamping means.

2. A core for an electrical transformer comprising a pair of opposing frame pieces of magnetic material defining an open body when placed together, one set of ends of said frame pieces being in abutment with each other, the other set of ends of said frame pieces having parallel opposing surfaces, said surfaces being formed with opposing recesses, a resilient spacer element substantially housed in said recesses and being arranged to prevent said opposing surfaces of said other set of ends from abutting each other, respective flat yoke members engaging the opposite sides of said frame pieces, and adjustable clamping means extending through said yoke members and arranged to urge the frame pieces together, said spacer element providing an air gap between said parallel opposing surfaces of said other set of ends whose length may be varied by adjusting said clamping means.

3. A core for an electrical transformer comprising a pair of opposing generally C-shaped frame pieces of magnetic material defining an open body when placed together, one set of ends of said frame pieces being substantially in abutment with each other, the other set of ends of said frame pieces being formed with parallel opposing surfaces formed with opposed recesses, a generally oval spacer member of elastic deformable material secured in one of said recesses and received in the other recess, said spacer member being substantially housed in said recesses, said spacer member being arranged to prevent said parallel opposing surfaces of said other set of ends from abutting each other and to urge said other set of ends apart, respective plate members engaging the opposite sides of said frame pieces, means connecting the plate members adjacent said one set of ends of the frame pieces, a bolt extending through the plate members adjacent said other set of ends, and a nut threaded on said bolt and arranged to provide adjustable clamping pressure urging said other set of ends together, said spacer member providing an air gap between said parallel opposing surfaces of said other set of ends whose length may be varied by adjusting said nut on said bolt.

4. In a cathode ray beam deflection system, a horizontal sweep transformer including a core comprising a pair of opposing frame pieces of magnetic material of similar shape and defining an open body when placed together, means clamping one set of ends of said frame pieces in abutment with each other, the other set of ends of said frame pieces having parallel opposing surfaces formed with opposed cavities, a resilient spacer element substantially housed in said opposed cavities and arranged to define an air gap between said parallel opposing surfaces of said other set of ends, and adjustable clamping means connecting said other set of ends and urging said parallel opposing surfaces of said other set of ends towards each other.

5. A core for an electrical transformer comprising a pair of opposing, generally C-shaped frame pieces of magnetic material defining an open body when placed together, one set of ends of said frame pieces being substantially in abutment with each other, the other set of ends of said frame pieces being formed with parallel opposing surfaces formed with opposed recesses, a generally oval spacer member of elastic deformable material secured in one of said recesses and received in the other recess, said spacer member being substantially housed in said recesses, said spacer member being arranged to prevent said parallel opposing surfaces of said other set of ends from abutting each other and to urge said other set of ends apart, the outer sides of said frame pieces being each formed with a peripheral recess, respective rectangular ring-shaped plate members seated in the peripheral recesses of the frame pieces, means connecting the plate members adjacent said one set of ends of the frame pieces, a bolt extending through the plate members adjacent said other set of ends, a nut threaded on said bolt and arranged to provide adjustable clamping pressure urging said other set of ends together, said spacer member providing an air gap between said parallel opposing surfaces of said other set of ends whose length may be varied by adjusting said nut on said bolt, and means rigidly connecting the plate members adjacent said bolt but spaced sufficiently therefrom to allow the plate members to flex inwardly responsive to tightening of said nut on the bolt.

References Cited in the file of this patent

UNITED STATES PATENTS

| Number | Name | Date |
|---|---|---|
| 349,611 | Stanley, Jr. | Sept. 21, 1886 |
| 382,336 | Thomson | May 8, 1888 |
| 1,615,018 | Langdon-Davies et al. | Jan. 18, 1927 |
| 1,756,875 | Montsinger | Apr. 29, 1930 |
| 2,133,919 | Fries | Oct. 18, 1938 |
| 2,440,342 | Mayne | Apr. 27, 1948 |
| 2,446,624 | Allison | Oct. 10, 1948 |
| 2,534,557 | Ostreicher | Dec. 19, 1950 |